United States Patent [19]

Bennett

[11] Patent Number: 4,714,662
[45] Date of Patent: Dec. 22, 1987

[54] POWER MODULE ASSEMBLY OF ELECTROCHEMICAL CELLS

[75] Inventor: William R. Bennett, North Olmsted, Ohio

[73] Assignee: Gould Inc., Rolling Meadows, Ill.

[21] Appl. No.: 27,061

[22] Filed: Mar. 17, 1987

Related U.S. Application Data

[63] Continuation-in-part of Ser. No. 862,613, May 12, 1986, abandoned.

[51] Int. Cl.$^4$ ............................................. H01M 12/06
[52] U.S. Cl. ........................................ 429/27; 429/68; 429/72
[58] Field of Search ...................... 429/27, 67, 68, 72, 429/81, 113, 66, 14

[56] References Cited

U.S. PATENT DOCUMENTS

| | | | |
|---|---|---|---|
| 4,188,462 | 2/1980 | Klootwyk | 429/68 |
| 4,189,528 | 2/1980 | Klootwyk | 429/70 |
| 4,200,685 | 4/1980 | Klootwyk et al. | 429/70 |
| 4,317,863 | 3/1982 | Struthers | 429/19 |
| 4,461,817 | 7/1984 | Itoh et al. | 429/209 |
| 4,560,626 | 12/1985 | Joy | 429/27 |
| 4,564,570 | 1/1986 | Gordon | 429/212 |

Primary Examiner—Anthony Skapars
Attorney, Agent, or Firm—Staas & Halsey

[57] ABSTRACT

A power module of the type including a plurality of power cells arranged in a longitudinal stacked relation. Each power cell includes a frame, a gas-consuming cathode supported at one end of the frame and a consumable anode supported intermediate the ends of the frame by a flexible diaphragm spanning the frame. The diaphragm divides the frame into a chamber for the introduction thereinto of an electrolyte between the anode and the cathode, and an expansion chamber on the opposite side of the anode for the introduction thereinto of fluid under pressure. The pressurized fluid biases the anode toward the cathode during anode consumption, and the diaphragm provides for longitudinal and angular movement of the anode to accommodate uneven corrosion of the anode. The frames of adjacent cells define a third chamber therebetween for the introduction of consumable gas to the cathode. An array of manifolds are formed throughout the frames of adjacent power cells for introducing electrolyte between the anode and the cathode, for introducing consumable gas to the cathode and for introducing fluid under pressure to the expansion chamber.

10 Claims, 5 Drawing Figures

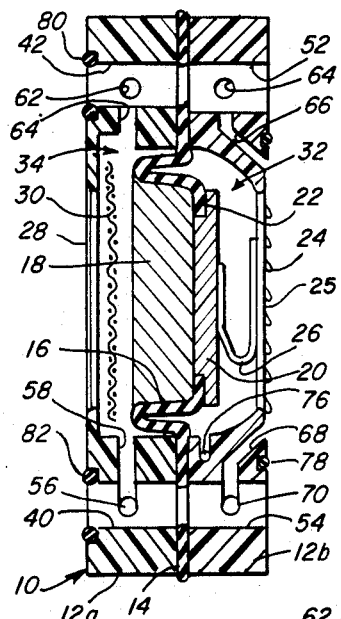
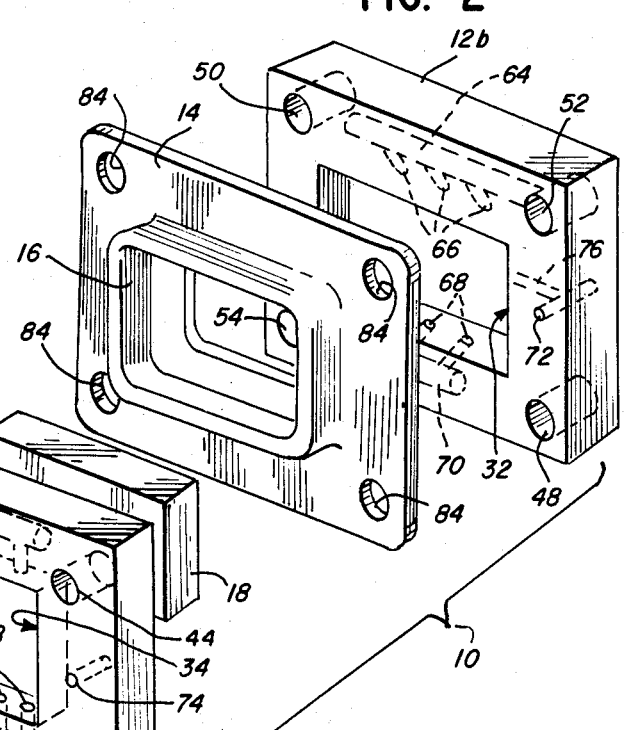
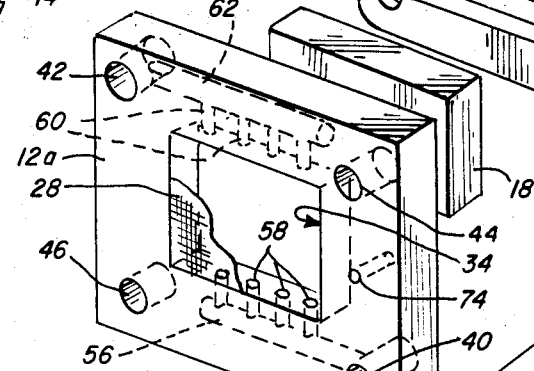
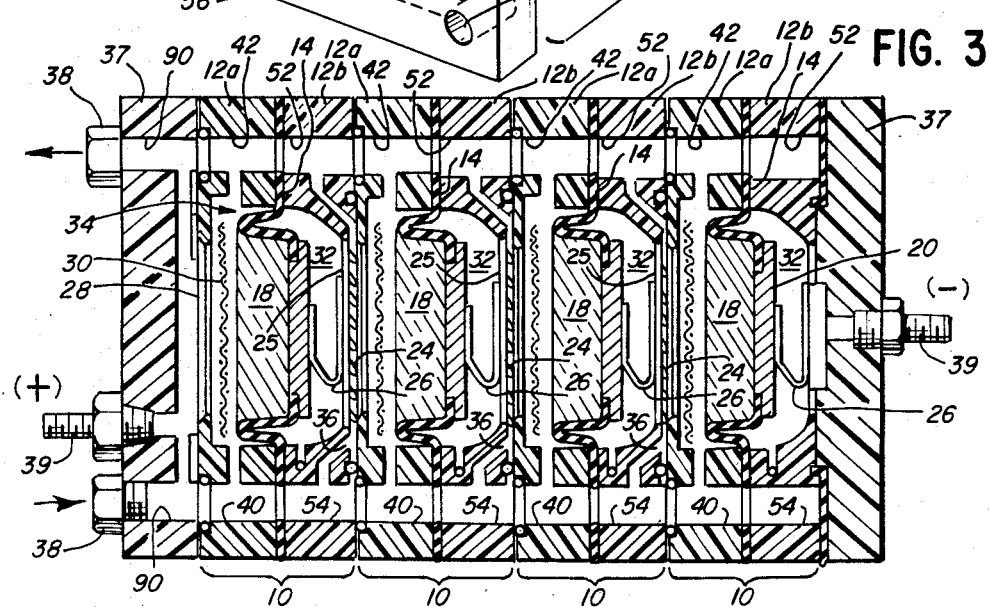
FIG. 1
FIG. 2
FIG. 3

FIG. 4
FIG. 5
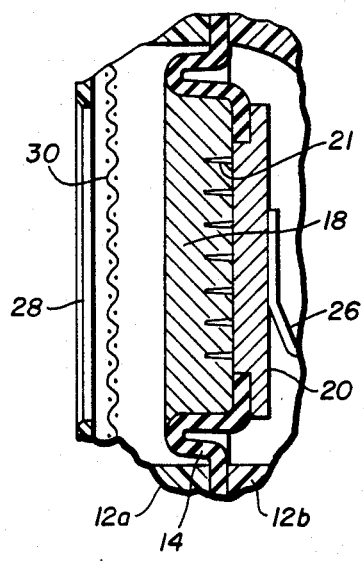
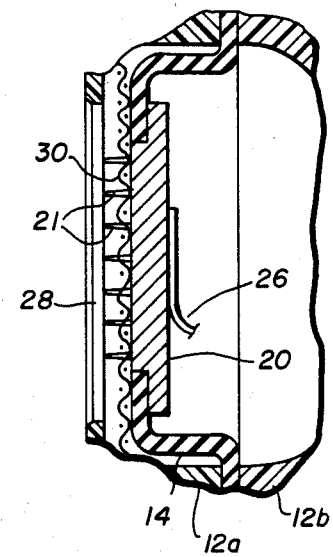

POWER MODULE ASSEMBLY OF ELECTROCHEMICAL CELLS

This is a continuation-in-part of co-pending application Ser. No. 862,613 filed on 5/12/86, now abandoned.

BACKGROUND OF THE INVENTION

1. Field of the Invention

This invention relates generally to electrochemical cells and, more particularly, this invention relates to power modules of the electrochemical type.

2. Description of the Prior Art

Electrochemical cells utilizing consumable, reactive metal anodes are well known. Multi-cell assemblies of such electrochemical cells or batteries to which this invention relates normally include a plurality of anodes and cathodes arranged in spaced relation within an overall case. The multi-cell assemblies have anodes and cathodes arranged in stacked relation within the overall case and electrolyte is flowed across the faces of adjacent anodes and cathodes.

In one conventional form of electrochemical power module for providing electrical power, the anodes and cathodes are provided on opposite sides of bipolar plates to define bipolar electrodes connected in series between a pair of spaced end plates which define the ends of the case. An electrolyte is flowed across the spaced faces of adjacent anodes and cathodes. Typically, each anode comprises an alkali metal, such as lithium, in elemental, compound, complex, amalgam or mixture form, in conjunction with a cathode typically of a suitable metal such as iron or silver oxide, and an aqueous or non-aqueous electrolyte The electrolyte normally comprises an aqueous solution of lithium hydroxide Such cells are described in detail in numerous patents and publications, including U.S. Pat. Nos. 3,791,871 (Rowley); 3,976,509 (Tsai et al); 4,007,057 (Littauer et al); and 4,188,462 (Klootwyk). Such electrochemical cells or batteries provide significant power output, but have the disadvantage of relatively high weight and cost. Therefore, such cells may not be desirable for use in aeronautical applications, for instance.

Another conventional form of electrochemical cell for providing electrical power utilizes a lithium anode and an air cathode. An example of an electrochemical cell having an air cathode is shown in U.S. Pat. No. 4,528,249 (Galbraith). Such cells do not provide the power output of conventional metal cathode cells, but they are of relatively low weight and cost.

In either form of electrochemical cell, intercell resistance losses are of concern. Such losses are a source of lost power. In either form of electrochemical cell, the anode usually is the consumable electrode. As the lithium or like material anode is consumed, the resistance paths are increased. Consequently, various attempts have been made to maintain constant electrode spacing as the anode is consumed.

For instance, in U.S. Pat. Nos. 4,189,528 (Klootwyk) and 4,200,685 (Klootwyk et al), power module assemblies are shown in the form of electrochemical batteries which include a plurality of anode-cathode units arranged in stacked relation within a housing. As the anodes are consumed, the stack is compressed by means of a pressure device including an expandable chamber at one end of the stack for transmitting pressure to the stack by introducing fluid under pressure into the expansion chamber. In U.S. Pat. No. 4,188,462 (Klootwyk), each cell in the bipolar module is a single unit which includes a pressure device in the form of an expansion bag for engaging the anode to accommodate anode erosion.

While the use of pressure devices such as expansion chambers, in the form of bellows or bags of the prior art, have proven effective to some degree in reducing shunt losses, certain problems still have not been met. For instance, when expansion chambers are utilized at one end of a stack of cells in an overall case, the problem of friction or drag on the individual cells causes uneven forces and sometimes jamming of the cells within the overall case. In addition, as the individual cells are moved to one end of the case during anode consumption, the center of gravity and balance of the overall cell changes. Even when individual expansion chambers are used for each individual cell, compensation is not made for uneven consumption of the respective anode itself. In other words, in order to maintain true spacing between the anode and the cathode, compensation must be made for uneven anode erosion which results in "cocking" of the anode. Such problems have not been adequately addressed by the prior art.

Furthermore, the use of such expansion chambers have been primarily applied to metal anode and cathode arrays, and not to air cathode electrochemical cells. With air cathode cells, a sealing problem always is encountered because of the use of different fluids, i.e. air and electrolyte.

Another problem with electrochemical cells involves providing adequate protection around the edges or perimeter of the consumable anode so that the anode does not wear unevenly about the perimeter. If the perimeter is not adequately protected, due to the well-known reaction of the anodic metal with the electrolyte, the anode wears unevenly about the perimeter, resulting in significantly decreased battery power and energy output, while proportionately increasing the cells heat and hydrogen gas output rate. This problem is described in U.S. Pat. No. 4,564,570 (GORDON).

A further problem found in electrochemical cells of the type herein described resides in the fact that as the anode plates are consumed, they tend to become unstable and to break apart. This problem is described in U.S. Pat. No. 4,317,863 (STRUTHERS).

This invention is directed to solving one or more of the above problems by providing a new and improved power module for accommodating anode consumption and eliminating intercell resistance losses in either a metal cathode or air cathode form of electrochemical cell.

SUMMARY OF THE INVENTION

An object, therefore, of the invention is to overcome the problems described above by providing a new and improved power module of the type including a plurality of electrochemical power cells in a stacked array.

In the exemplary embodiment of the invention, a power module is disclosed of the type including an elongated housing for receiving a plurality of power cells arranged in stacked relation longitudinally within the housing. Each power cell includes a frame, a cathode supported on the frame and a consumable anode. Biasing means are operatively associated with the anode for biasing the anode toward the cathode as the anode is consumed. The anode is mounted in the frame by suspension means which provide for longitudinal and angular movement of the anode as the anode is consumed, thereby to accommodate uneven anode consumption and to provide true constant interelectrode spacing and unlimited stacking flexibility.

The suspension means include a resilient member in the form of a flexible diaphragm which supports and carries the consumable anode. The diaphragm cooperates with the housing to form a sealed expansion chamber on the side of the consumable anode opposite the cathode. Fluid under pressure is introduced into the expansion chamber. The flexible diaphragm also cooperates with the housing to define a sealed flow passage between the anode and cathode for the introduction therethrough of the electrolyte. Therefore, the diaphragm divides the housing into sealed chambers for receiving fluid under pressure into one of the chambers to accommodate anode consumption and for introducing electrolyte into the other chamber between the anode and cathode.

The invention is disclosed herein in an air cathode electrochemical cell. The gas-consuming cathode is mounted at one end of the cell frame. Seal means are provided for spacing adjacent cell frames to provide passage means for soluble gas to the gas-consuming cathode.

Adjacent frames for the power cells cooperate to define first manifold means for introducing electrolyte to the flow passage between the anode and cathode, second manifold means for introducing soluble gas to the air cathode, and third manifold means for introducing fluid under pressure into the expansion chamber on the one side of the flexible diaphragm that carries the consumable anode.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a vertical section through a power cell embodying the concepts of the invention;

FIG. 2 is an exploded perspective view of the major components of the power cell;

FIG. 3 is a vertical section through a power module incorporating a plurality of the power cells of FIGS. 1 and 2 arranged in stacked relation;

FIG. 4 is a vertical section through a portion of a power cell showing the anode partially consumed and the current collector block having prongs; and FIG. 5 is a vertical section through a portion of a power cell showing the anode fully consumed and the prongs extending through the separator screen to contact the cathode.

DETAILED DESCRIPTION OF THE INVENTION

As is well known in the art, a reactive metal electrochemical cell generally comprises an anode of a reactive metal, a cathode spaced therefrom, and an aqueous or non-aqueous electrolyte which contacts at least a portion of the anode and the cathode during operation of the cell. Each of the anode and cathode are connected to a terminal, and the respective terminals are connected to a load during operation.

The anode typically is of an alkali metal such as sodium, for example, and preferably is of lithium. The anodic metal may be present in elemental, compound, complex, amalgam or mixture form, as is well known in the art.

The anode and the cathode often are spaced from each other by a mechanical separator, which may be a catalyst, or merely by the metallic hydroxide film which invariably forms on the anode.

In one conventional form of electrochemical cell, the cathode may be of any suitable metal, such as iron or silver oxide, for example. Another conventional form of electrochemical cell utilizes a gas-consuming cathode such as an air cathode. The invention is illustrated herein in an electrochemical cell which utilizes a gas-consuming or air cathode.

Referring to the drawings in greater detail, it first should be understood that the sectional depictions of FIGS. 1 and 3 are not true vertical sections in the sense of being taken along a straight vertical line. The sections have been taken through the various manifold means for the electrolyte and the gas in order to better illustrate the direction of introduction of the electrolyte and the gas into and out of the chambers defined by the individual power cells and between adjacent cells.

More specifically, FIG. 2 shows, in perspective, the major components of each power cell, generally designated 10. Each cell includes a frame comprised of a first frame portion 12a and a second frame portion 12b between which is sandwiched a resilient member in the form of a flexible diaphragm 14. Diaphragm 14 is molded or formed to include a generally rectangular cup-shaped holder 16 for receiving a consumable anode 18. It can be seen that holder 16 of diaphragm 14 is open at both sides of the diaphragm. The diaphragm forms a suspension means for mounting anode 18 between frame portions 12a, 12b to provide for longitudinal (axial) as well as angular movement of the anode as the anode is consumed, as described hereinafter.

FIG. 1 shows anode 18 located within holder 16 of diaphragm 14, as the diaphragm is clamped in sealing relation between frame portions 12a and 12b. A current collector block 20 is bonded to one side of anode 18 and facilitates securing the anode to an inner peripheral portion 22 of diaphragm 14. A conducting plate 25 spans one side (the right-hand side as viewed in FIG. 1) of the cell frame, and a flexible conducting strap 26 interconnects current collector 20 and conducting plate 25.

In the embodiment of FIGS. 1-3, the current collector block 20 has a plane, flat surface on the side which is bonded to the anode. FIGS. 4 and 5 illustrate an additional embodiment wherein the face of the collector block 20 bonded to the anode 18 is provided with a plurality of prongs 21 which entend into the anode.

A gas-consuming or air cathode 28 spans the opposite end of power cell 10. A mechanical separator 30, as described above, is disposed between anode 18 and cathode 28. A screen often is chosen as the separator because it may have intimate contact with the anode over a large area while at the same time provide constant circulation of the electrolyte between the contacting surfaces of the cathode and the consumable anode.

From the foregoing, it immediately can be seen that flexible diaphragm 14 divides the cell frame (comprised of frame portions 12a, 12b) into two chambers, generally designated 32 and 34. Chamber 32 comprises an expansion chamber which, upon the introduction thereinto of fluid under pressure as described hereinafter, is effective to bias anode 18 toward cathode 28 to accommodate anode consumption. Chamber 34, facilitated by separator 30, defines a flow passage for the introduction thereinto of electrolyte between the anode and cathode, as described hereinafter.

Referring to FIG. 3, third chambers 36 are defined between adjacent cells 10 for the introduction therethrough of a consumable gas, such as air. To this end, conducting screens 24 (see FIG. 1) facilitate maintaining an air chamber gap between adjacent cells 10. As is known, air cathode 28 thereby has one surface (on the outside of the respective cell) in contact with an oxygen-containing gas, and a second surface (the inner surface) in contact with the electrolyte containing soluble oxygen for providing oxidizer to the cathode. As seen in FIG. 3, the stacked cells 10 are sandwiched between end plates 37 to define an overall case secured by appropriate fasteners, as at 38, with terminal posts 39 projecting on the outside of the end plates, as is known.

Manifold means are provided in frame portions 12a, 12b of each power cell 10 and cooperate with the frame portions of adjacent cells for introducing fluid under pressure to expansion chambers 32, for introducing electrolyte through chambers 34 between the anode and cathode, and for introducing consumable gas into chambers 36 between respective adjacent cells.

More particularly, referring to FIG. 2, each of frame portions 12a and 12b have bores or fluid passages 40–46 at the four corners of frame portion 12a and 48–54 at the four corners of frame portion 12b. Passages 40 and 48 of frame portions 12a and 12b, respectively, are in communication throughout the length of the stacked array of cells. Passages 42 and 50 of frame portions 12a and 12b, respectively, are in communication longitudinally through the array. Passages 44 and 52 of frame portions 12a and 12b, respectively, are in communication throughout the stacked array. Passages 46 and 54 of frame portions 12a and 12b, respectively, are in communication throughout the stacked array.

The manifold means for introducing electrolyte into chamber 34 between anodes 18 and cathodes 28 include a lower cross manifold passage 56 in frame portion 12a in communication with passage 40. The electrolyte is introduced into chamber 34 through a plurality of manifold openings 58. The electrolyte passes through chamber 34 and out through manifold openings 60 of an upper cross manifold portion 62 leading to passage 42. All of these manifold passage portions are formed interiorly of each frame portion 12a since that frame portion defines the respective chamber 34. It can be seen that passages 48 and 50 in frame portion 12b which are in communication with passages 40 and 42, respectively, of frame portion 12a, simply pass through frame portion 12b to provide a common inlet and outlet flow pattern through the stacked array of cells.

Similarly, each frame portion 12b has manifold means for introducing consumable gas to the respective chamber 36 and the cathode of the adjacent power cell. Specifically, an upper, cross manifold portion 64 is in communication with passage 52 in each frame portion 12b and has a plurality of manifold openings 66 for introducing the consumable gas into the respective chamber 36. The consumable gas passes through the chamber and out through openings 68 which lead to a lower, cross manifold portion 70 which is in communication with passage 54 in frame member 12b. Passages 44 and 46 of frame portion 12a simply pass through that frame portion and are in communication with passages 52 and 54, respectively, of frame portion 12b to provide a common flow path for consumable gas through the entire stacked array of power cells.

Third manifold means include passages 72 through each frame portion 12b and 74 through each frame portion 12a. These passages are in communication with each other and run the entire length of the stacked array of cells for the introduction of fluid under pressure to expansion chambers 32 in frame portions 12b. To this end, a manifold entry 76 is provided in each frame portion 12b in communication with passage 72 for introducing fluid under pressure into expansion chamber 32.

Referring back to FIG. 1, O-rings 78 are provided between adjacent power cells 10 to seal chambers 36 into which consumable gas is introduced between the cells into contact with the respective cathodes 28. O-ring seals 80 and 82 are provided between adjacent cells about passages 40 and 42 to prevent any leakage of electrolyte passing through those passages. Flexible diaphragm 14 is fabricated of a resilient or elastomer material, and the diaphragm itself forms a composite seal between frame portions 12a, 12b, with holes 84 formed at the corners of the diaphragm in communication with the respective passages 40–46 in the respective frame portion 12a and 48–54 in the respective frame portion 12b.

Lastly, appropriate entry means are provided into the overall case of stacked cells for introduction of the electrolyte, the pressurized fluid and the consumable gas, as at 90 in end plate 37 in FIG. 3.

With the construction of the diaphragm 14 as described above, as the anode 18 is consumed and moved forwardly, the portion of the diaphragm around the perimeter of the anode slowly peels back at substantially the same rate as the anode is moved toward the cathode so that only the face of the anode is exposed to the electrolyte and the remainder of the sides of the perimeter of the anode are protected from the electrolyte. Moreover, the collector block 20 mounted in the diaphragm 14 provides solid support along the entirety of the back of the anode, thereby permitting the anode to be totally consumed without the anode crumbling or breaking prior to complete consumption.

In the embodiment shown in FIGS. 4 and 5, the prongs 21, when the anode is totally consumed as shown in FIG. 5, extend through the separator 30 to contact the anode and therefore permit a given cell to short circuit itself out of service after the anode is consumed. This feature is important in situations wherein a given cell might be consumed prematurely. If such were the case, that given cell would simply short circuit itself out and the remainder of the power module would continue to operate. In addition, the flexible conducting strap 26 provides a convenient means of maintaining a conductive path between the collector block 20 and the plate 25 and screen 24 as the anode 18 is consumed and the diaphragm 14 is pushed forwardly.

With the above construction, the diaphragm 14 thus acts both to bias the anode forwardly as the anode is consumed and to protect the sides or perimeter of the anode and the collector block from the electrolyte. Protecting the collector block 20 from the electrolyte is advantageous since an electrolyte wetted collector block can react with the anode and electrolyte in a parasitic fashion. This reaction is quite vigorous in a lithium-air power module.

A further advantage of the construction described above resides in the provision of separate chambers for the pressurizing fluid and the consumable gas. By having such separate chambers, a non-flowing fluid, i.e., fluid maintained at a constant pressure can be used to bias the anode. If a single chamber were employed to bias the anode and contain the consumable gas, it would be necessary to pressure the consumable gas supply, thus resulting in a more complex structure and an increase in the power consumed by the power module system to run itself.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A power module of the type including a plurality of power cells arranged in alongitudinal stacked relation, each power cell including a frame, a gas-consuming cathode mounted at one end of the frame, a consumable anode, a flexible diaphragm mounting the anode in the frame to provide for longitudinal and angular movement of the anode as the anode is consumed, the flexible diaphragm cooperating with the frame to define a sealed expansion chamber on the side of the anode opposite the cathode, first means for introducing fluid under pressure into the expansion chamber to bias the anode toward the cathode, the flexible diaphragm cooperating with the frame to define a sealed flow passage between the anode and the cathode, second means for introducing electrolyte into the flow passage, means spacing and sealing adjacent cell frames providing separate passage means for soluble gas to the gas-consuming cathode, and third means for introducing soluble gas into the separate passage means.

2. The power module of claim 1 which includes a current collector block attached to one side of the anode.

3. The power module of claim 2 which further includes a conducting plate spaced from the current collector block and flexible conducting means interconnecting the current collector block and the conducting plate.

4. The power module of claim 2 which includes a plurality of prongs on the current collector block which extend into the anode.

5. The power module of claim 1 wherein the diaphragm includes a holder portion for receiving the anode.

6. The power module of claim 5, wherein the holder portion surrounds the perimeter of the anode and is folded over whereby as the anode is consumed and moved towards the cathode, the folded portion of the holder is peeled back at substantially the same rate as the anode is moved towards the anode to thereby leave only the face of the anode exposed to the electrolyte and the remainder of the sides of the perimeter of the anode protected from the electrolyte.

7. The power module of claim 1 wherein the first, second and third means include manifold means throughout the frames of adjacent power cells.

8. A power module of the type including a plurality of power cells arranged in a longitudinal stacked relation, each power cell including a frame, a gas consuming cathode mounted at one end of the frame, a consumable anode, a flexible diaphragm mounting the anode in the frame to provide for longitudinal and angular movement of the anode as the anode is consumed, a holder portion in the diaphragm for receiving the anode, the holder portion surrounding the perimeter of the anode and being folded over, a current collector block attached to one side of the anode, the flexible diaphragm cooperating with the frame to define a sealed expansion chamber on the side of the anode opposite the cathode, first means for introducing fluid under pressure into the expansion chamber to bias the anode toward the cathode, the flexible diaphragm cooperating with the frame to define a sealed flow passage between the anode and the cathode, second means for introducing electrolyte into the flow passage, means spacing and sealing adjacent cell frames providing separate passage means for soluble gas to the gas consuming cathode and third means for introducing soluble gas into the separate passage means.

9. The power module of claim 8, which further includes a conducting plate spaced from the current collector block and flexible conducting means interconnecting the current collector block and the conducting plate.

10. The power module of claim 8 wherein the first, second and third means include manifold means throughout the frames of adjacent power cells.

* * * * *